(12) United States Patent
Amrani et al.

(10) Patent No.: US 12,518,154 B2
(45) Date of Patent: Jan. 6, 2026

(54) TRAINING MULTIMODAL REPRESENTATION LEARNING MODEL ON UNANNOTATED MULTIMODAL DATA

(71) Applicant: International Business Machines Corporation, Armonk, NY (US)

(72) Inventors: Elad Amrani, Zikhron Yaakov (IL); Rami Ben-Ari, Kiryat-Ono (IL); Daniel Nechemia Rotman, Haifa (IL); Udi Barzelay, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 16/984,909

(22) Filed: Aug. 4, 2020

(65) Prior Publication Data
US 2022/0044105 A1 Feb. 10, 2022

(51) Int. Cl.
*G06N 3/08* (2023.01)
*G06F 40/10* (2020.01)
*G06N 3/047* (2023.01)

(52) U.S. Cl.
CPC .............. *G06N 3/08* (2013.01); *G06F 40/10* (2020.01); *G06N 3/047* (2023.01)

(58) Field of Classification Search
CPC .......... G06N 3/08; G06N 3/047; G06N 3/088; G06F 40/10; G06F 40/30
See application file for complete search history.

(56) References Cited

U.S. PATENT DOCUMENTS

2019/0018933 A1    1/2019  Oono et al.

OTHER PUBLICATIONS

Zhou ("Weakly-Supervised Video Object Grounding from Text by Loss Weighting and Object Interaction") arXiv:1805.02834v2 [cs.CV] Jul. 20, 2018 (Year: 2018).*
Harwath ("Jointly Discovering Visual Objects and Spoken Words from Raw Sensory Input") Proceedings of the European Conference on Computer Vision (ECCV), 2018, pp. 649-665 (Year: 2018).*
Lu ("ViLBERT: Pretraining Task-Agnostic Visiolinguistic Representations for Vision-and-Language Tasks") 33rd Conference on Neural Information Processing Systems (NeurIPS 2019), Vancouver, Canada. (Year: 2019).*
Mithun ("Joint embeddings with multimodal cues for video-text retrieval") International Journal of Multimedia Information Retrieval vol. 8, pp. 3-18 (2019) (Year: 2019).*
Amrani ("Noise Estimation Using Density Estimation for Self-Supervised Multimodal Learning") arXiv:2003.03186v1 [cs.CV] Mar. 6, 2020 (Year: 2020).*
Amrani ("Toward Self-Supervised Object Detection in Unlabeled Videos") arXiv:1905.11137v1 [cs.CV] May 27, 2019 (Year: 2019).*

(Continued)

*Primary Examiner* — Shahid K Khan
*Assistant Examiner* — Su-Ting Chuang
(74) *Attorney, Agent, or Firm* — CHIP LAW GROUP (57) ABSTRACT

An example system includes a processor to receive unannotated multimodal data. The processor can estimate a probability an associated pair of different modalities in the unannotated multimodal data to be correctly associated using a multimodal similarity function and a local density estimation. The processor can also train a multimodal representation learning model on the unannotated multimodal data using the estimated probability as a weight for the associated pair in a loss function.

20 Claims, 8 Drawing Sheets

(56) References Cited

OTHER PUBLICATIONS

Xie ("Unsupervised Deep Embedding for Clustering Analysis") Proceedings of the 33 rd International Conference on Machine Learning, New York, NY, USA, 2016. JMLR: W&CP vol. 48 (Year: 2016).*
Zhang ("Learning Local Descriptors With a CDF-Based Dynamic Soft Margin") Proceedings of the IEEE/CVF International Conference on Computer Vision (ICCV), 2019, pp. 2969-2978 (Year: 2019).*
Wahid ("An Outlier Detection Algorithm based on KNN-kernel Density Estimation") Published in: 2020 International Joint Conference on Neural Networks (IJCNN) Jul. 19-24, 2020 (Year: 2020).*
Wang ("Inductive Zero-Shot Image Annotation via Embedding Graph") Digital Object Identifier 10.1109/ACCESS.2019.2925383 (Year: 2019).*
Atrey ("Multimodal fusion for multimedia analysis: a survey") Multimedia Systems (2010) 16:345-379 DOI 10.1007/s00530-010-0182-0 (Year: 2010).*
Wu ("Online Multi-Modal Distance Metric Learning with Application to Image Retrieval") IEEE Transactions on Knowledge and Data Engineering, vol. 28, No. 2, Feb. 2016 Date of publication Sep. 8, 2015; (Year: 2015).*
Khurana ("CSTNet: Contrastive Speech Translation Network for Self-Supervised Speech Representation Learning") arXiv:2006.02814v1 [eess.AS] Jun. 4, 2020 (Year: 2020).*
Brownlee, Jason, "A Gentle Introduction to Probability Density Estimation," Machine Learning Mastery, Sep. 25, 2019, 19 pages.
Chen, Yuanying et al., "Rapid: A Multimodal and Device-free Approach Using Noise Estimation for Robust Person Identification," Proceedings of the ACM on Interactive, Mobile, Wearable and Ubiquitous Technologies, 1, 3, Article 41, Sep. 2017, 27 pages.
Chlaily, Saloua et al., "Impact of Noise Correlation on Multimodality," 24th European Signal Processing Conference (EUSIPCO 2016), Aug. 29, 2016, 6 pages.
Goldberger, Jacob et al., "Training Deep Neural-Networks Using a Noise Adaptation Layer," In: ICLR, 2017, 9 pages.
Jiang, Lu et al., "Mentornet: Learning data-driven curriculum for very deep neural networks on corrupted labels," In: Proceedings of the 35th International Conference on Machine Learning, ICML, 2018, 10 pages.
Patro, Badri N. et al., "Robust Explanations for Visual Question Answering," ResearchGate, Indian Institute of Technology, Kampur, Jan. 23, 2020, 10 pages.
Tanaka, Daiki et al., "Joint Optimization Framework for Learning with Noisy Labels," In: Proceedings of the IEEE Conference on Computer Vision and Pattern Recognition, Mar. 30, 2018, 11 pages.
Amrani, et al., "Noise Estimation Using Density Estimation for Self-Supervised Multimodal Learning," CoRR [journal], Mar. 6, 2020, 17 pages, arXiv:2003.03186v1, Retrieved from the Internet: <URL: https://arxiv.org/abs/2003.03186>.
Gutmann, et al., "Noise-contrastive estimation: A new estimation principle for unnormalized statistical models," Proceedings of the 13th International Conference on Artificial Intelligence and Statistics (AISTATS), May 2010 [accessed on Nov. 7, 2023], pp. 297-304, vol. 9, Retrieved from the Internet: <URL: https://proceedings.mlr.press/v9/gutmann10a.html>.

* cited by examiner

TRAINING MULTIMODAL REPRESENTATION LEARNING MODEL ON UNANNOTATED MULTIMODAL DATA

BACKGROUND

The present techniques relate to neural networks. More specifically, the techniques relate to training neural networks using unannotated multimodal data.

SUMMARY

According to an embodiment described herein, a system can include processor to receive unannotated multimodal data. The processor can also further estimate a probability an associated pair of different modalities in the unannotated multimodal data to be correctly associated using a multimodal similarity function and a local density estimation. The processor can also train a multimodal representation learning model on the unannotated multimodal data using the estimated probability to be correctly associated as a weight for the associated pair in a loss function.

According to another embodiment described herein, a method can include receiving, via a processor, unannotated multimodal data. The method can further include estimating, via the processor, a probability of an associated pair of different modalities in the unannotated multimodal data to be correctly associated using a multimodal similarity function and a local density estimation. The method can also further include training, via the processor, a multimodal representation learning model on the unannotated multimodal data using the estimated probability to be correctly associated as a weight for each of the sample pairs in a loss function.

According to another embodiment described herein, a computer program product for training multimodal representation learning models can include computer-readable storage medium having program code embodied therewith. The computer readable storage medium is not a transitory signal per se. The program code executable by a processor to cause the processor to receive unannotated multimodal data. The program code can also cause the processor to estimate a probability an associated pair of different modalities in the unannotated multimodal data to be correctly associated using a multimodal similarity function and a local density estimation. The program code can also cause the processor to train a multimodal representation learning model on the unannotated multimodal data using the estimated probability to be correctly associated as a weight for the associated pair in a loss function.

DETAILED DESCRIPTION

Multimodal learning is used to train neural networks using multimodal learning representations for various downstream tasks, such as visual question answering (VQA) and text-to-video retrieval. A multimodal learning representation, as used herein, refers to a coordinated representation that aims to learn separated yet coordinated representations for each of two or more modalities under some constraints that enforce similarity among the modalities. A modality, as used herein, refers to a particular form of sensory perception, such as a visual modality or an auditory modality. A multimodal machine learning task or dataset includes a number of modalities. Gleaning information from multiple correlated data sources, multimodal learning may enable more insight than analysis of the individual monomodal sources that include only one modality. For example, using the correlation between speech and vision, a multimodal learning system may be able to recognize objects by their names, while learning the visual characteristics. Additionally, concepts can be learned separately and a combination can be comprehended automatically. For example, "running" and "beach" versus "running on the beach". As used herein, a concept refers to a specific object or action.

Manual annotation of large-scale datasets and specifically multimodal datasets is challenging and expensive. This difficulty of manual annotation may result in a shortage that limits the progress of supervised machine learning and thus a key development bottleneck. To combat costs and effort of annotation, self-supervised machine learning is used to better utilize abundant unlabeled data on the web. However, most self-supervised systems aim to learn from a single data modality, which may limit their applicability. Some self-supervised multimodal methods combine vision and language in using unlabeled instructional videos as training data for self-supervised multimodal learning systems due to the high correlation between the spoken word and the ongoing visuals. However, such self-supervised multimodal methods ignore the presence of high levels of noise and therefore may yield sub-optimal results. Noise, as used herein, refers to two or modalities of a multimodal sample not sharing the same semantic meaning. For example, a video-text pair may be associated with each other, yet the text may not be related to the ongoing visuals. Existing multimodal embedding models are susceptible to such noisy data. For example, the models may adjust to the noise in the data and thus yield sub-optimal results. This scenario may be particularly problematic in the case of self-supervised multimodal learning from unlabeled instructional videos. Although in these instructional videos there is some correlation between speech transcription and vision, unfortunately often a person may be talking about something that is not present visually. For example, in the HowTo100M dataset, manual inspection of 400 randomly sampled clip-caption pairs determined that in about half of the sampled clip-caption pairs there was not a single object or action mentioned in the caption that was also visually present in the video clip.

According to embodiments of the present disclosure, a multimodal learning model can be trained using noise estimation of multimodal data. An example system includes a processor to receive unannotated multimodal data. The processor can estimate a probability an associated pair of different modalities in the unannotated multimodal data to be correctly associated using a multimodal similarity function and a local density estimation. The processor can also train a multimodal representation learning model on the unannotated multimodal data using the estimated probability as a weight for the associated pair in a loss function.

Thus, embodiments of the present disclosure enable the training of a noise robust multimodal representation learning model. In particular, the embodiments of the present disclosure utilize the inherent correlation between different modalities for efficient multimodal learning in the presence of extreme levels of noise. Specifically, the embodiments reduce noise estimation to a density estimation problem. A multimodal similarity function is used to show that noise is correlated with sparsity and vice versa. The embodiments of the present disclosure also enable a true label estimation that does not require availability of clean labels. For example, the label estimation may be based on correlation between the modalities alone. Moreover, such noise estimation can be broadly integrated and was found to achieve comparable results to state-of-the-art performance on five different benchmark datasets for two challenging multimodal tasks, including VQA and text-to-video retrieval.

Figure 1:
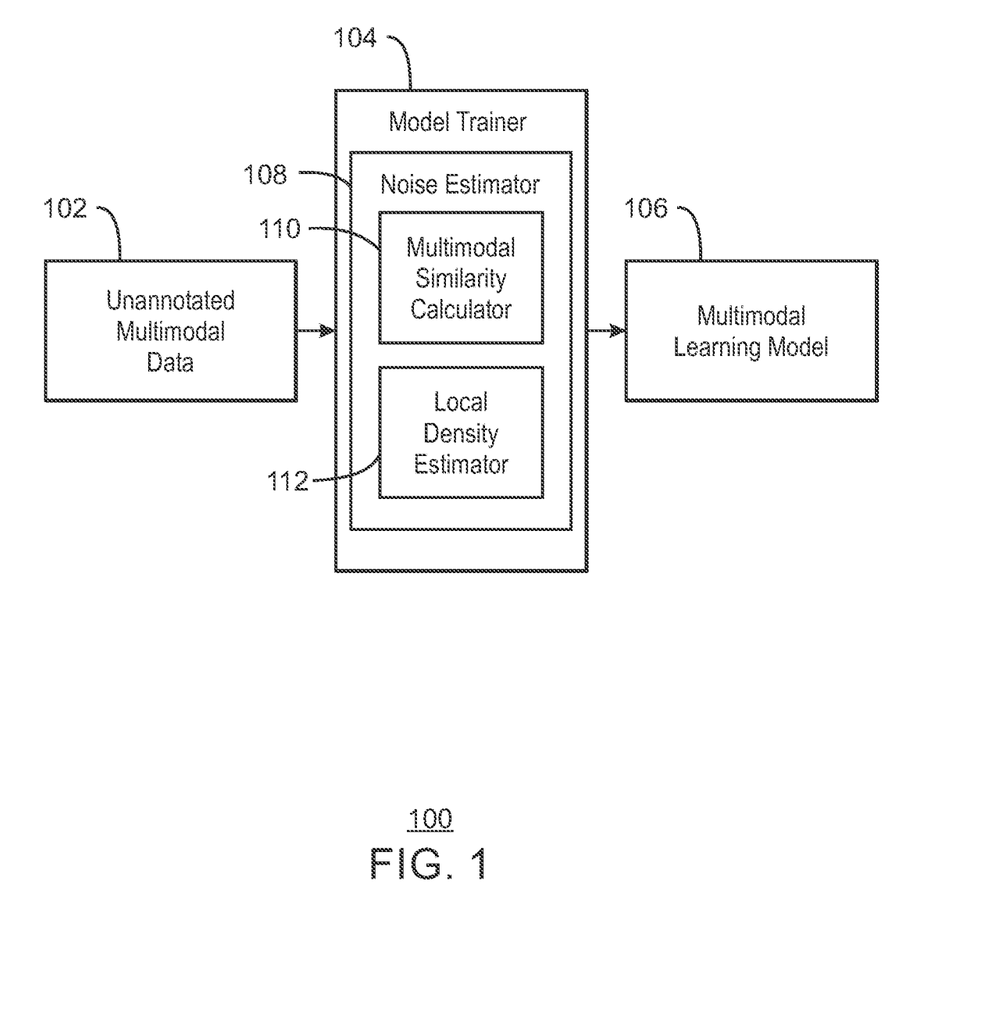
FIG. 1 is a block diagram of an example system for training a multimodal machine learning model using multimodal representation learning of unannotated multimodal data.

With reference now to FIG. 1, a block diagram shows an example system for training a multimodal machine learning model using multimodal representation learning of unannotated multimodal data. The example system 100 of FIG. 1 includes unannotated multimodal data 102 shown being received by a model trainer 104. The system 100 includes a multimodal learning model 106 shown being output by the model trainer 104. For example, the multimodal learning model 106 may include a set of weights to be used for a neural network, such as a convolutional neural network. The model trainer 104 includes a noise estimator 108. The noise estimator 108 includes a multimodal similarity calculator 110 and a local density estimator 112.

In the example of FIG. 1, the model trainer 104 can automatically train a multimodal representation learning model in an unsupervised manner. For example, the model trainer 104 receives unannotated multimodal data 102. In various examples, the unannotated multimodal data 102 may have at least two modalities. For example, the unannotated multimodal data 102 may include a visual modality and an auditory modality. In various examples, any other combination of other modalities may be additionally or alternatively be included in the unannotated multimodal data 102. For example, such modalities may include a pressure modality, a chemical composition detection modality, an audio modality, etc. As one example, the unannotated multimodal data 102 may be video clips with associated captions corresponding to speech in the video clips. The video clips may thus include a visual modality and an auditory modality.

Figure 2:
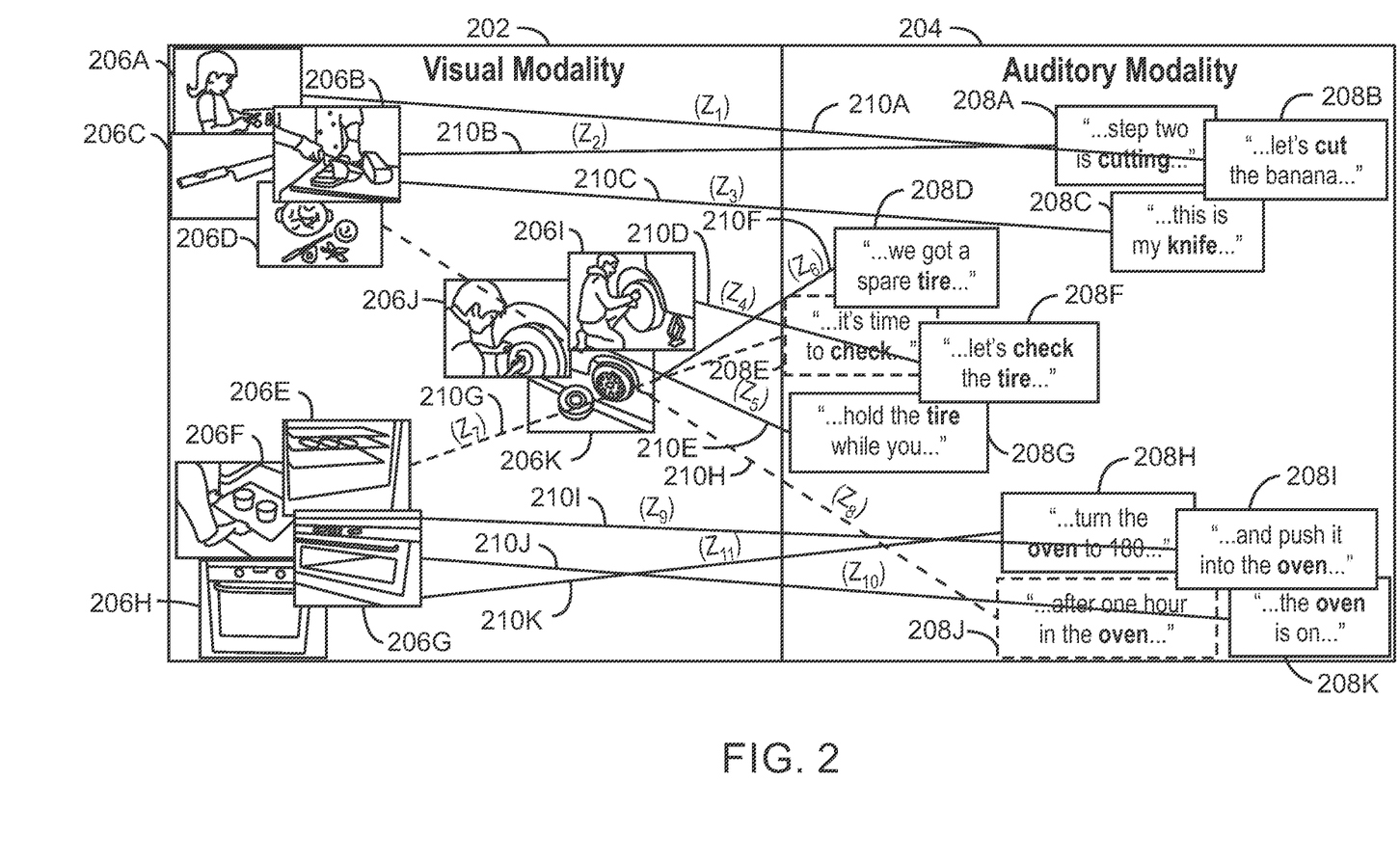
FIG. 2 is an example multimodal data visualization with concepts clustered in monomodal spaces.

In various examples, the model trainer 104 can represent the unannotated multimodal data 102 using a mixture model. For example, the distributions of the videos and captions can be represented using a mixture model of T components in the corresponding modality. Denoting by a, b∈{1, ..., T} the concept to which the video v and the caption c belong, respectively, a mixture model may be represented as v|a~pv (v|a) and c|b~pc(c|b). Assuming that this mixture model representation holds true, then correctly associated pairs may form dense clusters in both modalities that contain pairs that are also associated with each other. An example multimodal data visualization showing such clustering in two modalities of a multimodal data source is shown in FIG. 2.

Figure 4:
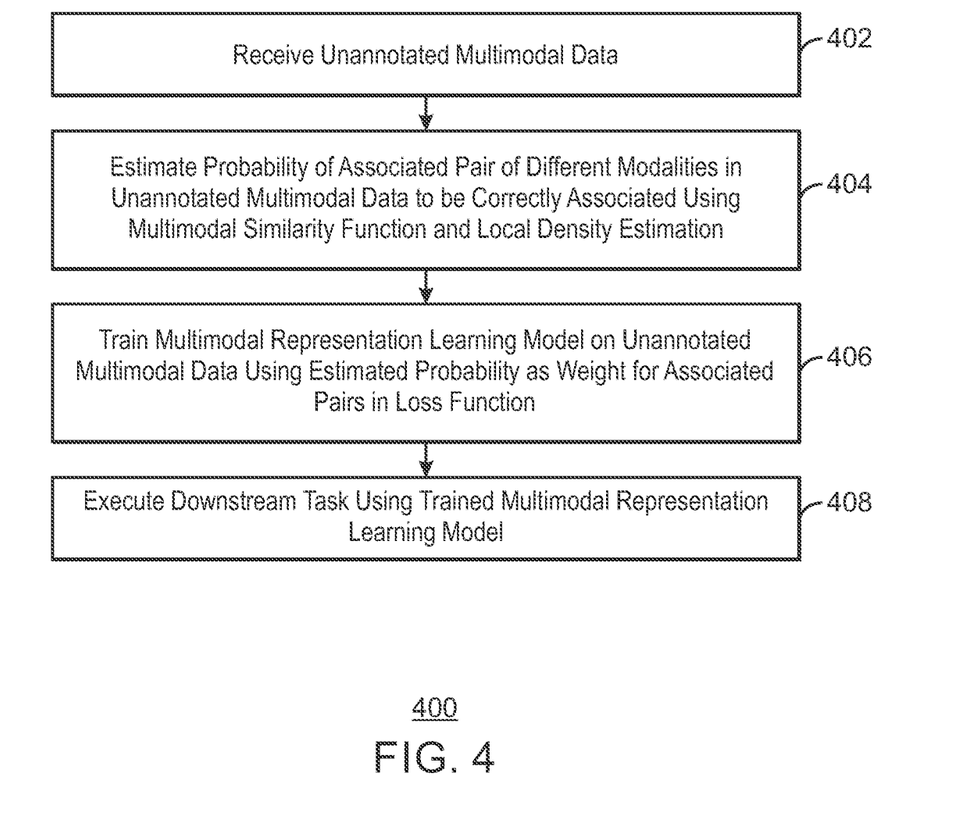
FIG. 4 is a block diagram of an example method that can train a multimodal machine learning model to execute downstream tasks using multimodal representation learning of unannotated multimodal data.

In various examples, the multimodal similarity calculator 110 can estimate a probability of each sample pair in the unannotated multimodal data to be correctly associated. For example, the multimodal similarity calculator 110 can be used to find correctly associated pairs using a multimodal similarity function to serve as a similarity measure between pairs. A correctly associated pair may be a clip-caption pair (v, c) that share the same semantic meaning or concept. For example, the caption c describes the ongoing visuals v. By contrast, an incorrectly associated pair may be a clip-caption pair (v, c) that does not share the same semantic meaning or concept. For example, the multimodal similarity function may include a multimodal density formulation, in which pairs in dense areas are more likely to be correctly associated, while pairs in sparse areas are more likely to be wrongly associated. For example, a set of clip-caption pairs may be denoted by $\{(v_i, c_i) \in \mathbb{R}^{d_v} \times \mathbb{R}^{d_c}\}_{i=1}^M$, where for each i, the video clip $v_i$ is associated with the caption sentence $c_i$, and $c_i$ denotes the size of the dataset. Let $p_i \in \{0, 1\}$ may denote a binary indicator for whether the pair $(v_i, c_i)$ is correctly associated or wrongly associated. As one example, $p_i=0$ if the pair is wrongly associated and $p_i=1$ if the pair is correctly associated. In various examples, $f_v: \mathbb{R}^{d_v} \to \mathbb{R}^d$ and $fv: \mathbb{R}^{d_c} \to \mathbb{R}^d$ may denote the embedding functions of the videos and the captions, respectively, into a common representation space. The task of noise robust multimodal representation learning may map all of the data modalities to a single embedding space such that for all $v_i$ that is correctly associated} with $c_i$, $f_v(v_i) \approx f_c(c_i)$ in the sense of some similarity function. For the ease of notation, an associated pair may be denoted as $z_i=(v_i, c_i)$. In various examples, a multimodal similarity function between pairs S: $\mathbb{R}^{d_v+d_c} \times \mathbb{R}^{d_v+d_c} \to \mathbb{R}$ may be defined using the equation:

$$S(z_i, z_j) \triangleq \min\left\{\frac{s(v_i, v_j) - \bar{\mu}_v}{\bar{\sigma}_v}, \frac{s(c_i, c_j) - \bar{\mu}_c}{\bar{\sigma}_c}\right\} \quad \text{Eqn. 1}$$

where s can be, for example, the cosine similarity function:

$$s(x, y) = \frac{x^T y}{\|x\|\|y\|} \quad \text{Eqn. 2}$$

and where $\bar{\mu}_v$ and $\bar{\mu}_c$ are the sample means and standard deviations of each modality. In various examples, s can be any other suitable similarity function. Thus, in various examples, the similarity values of each modality may be normalized before taking the minimum. Using Eq. 1, a pair $z_i$ is close to $z_j$ only if $v_i$ is close to $v_j$ and $c_i$ is close to $c_j$ as well. In some examples, instead of the minimum function used in Eq. 1, the average of similarities in the different modalities may be used to calculate $S(z_i, z_j)$. In any case, using any suitable measure, both similarities of each modality may be high to produce a high multimodal similarity. In various examples, the estimated probability $\hat{p}_i$ of $z_i$ being correctly associated may be computed using a local k-nearest neighbor (k-NN) density estimation normalized via the following equation:

$$\hat{p}_i \triangleq \frac{\overline{S}_i - \min(\overline{S})}{\max(\overline{S}) - \min(\overline{S})} \qquad \text{Eqn. 3}$$

where $\hat{p}_i \in [0, 1]$, and where:

$$\overline{S}_i = \frac{1}{K}\sum_{k=1}^{K} S(z_i, z_{ik}), i \in [M] \qquad \text{Eqn. 4}$$

where $z_{ik}$ is the k-th nearest neighbor of $z_i$ and S is the multimodal similarity function defined in Eq. 1. An example multimodal space with pairs of concepts clustered according to such a multimodal density formulation is shown in FIG. 4. Eqn. 3 may thus be a noise estimation based on a density estimation.

In various examples, the noise estimation using multimodal density estimation $\hat{p}_i$ may be incorporated into a loss function used for training a neural network model. In various examples, the noise estimation component may be integrated into a max margin ranking loss function. As one example, each pair $z_i$ may be weighted with an associated estimated probability $\hat{p}_i$ of being correctly associated. For example, a max margin ranking loss function referred to herein as a soft max margin ranking function can be calculated using the equation:

$$L_{soft\text{-}rank} = \Sigma_{i \in P}(\hat{p}_i \Sigma_{j \in N_i} \max\{0, s_{ij} - s_{ii} + \delta\} + \max\{0, s_{ji} - s_{ii} + \delta\}) \qquad \text{Eqn. 5}$$

where P is the set of noisy associated (positive) pairs, $N_i$ is the set of negative pairs for clip-caption pair $(v_i, c_i)$, $\hat{p}_i$ is defined using Eq. 3, $s_{ij}$ is the similarity score between the embedding of the clip-caption pair $((f_v(v_i), f_c(c_j))$, and $\delta$ is the margin. The first term in Equation 5 is for matching a video with a negative caption and the second term is for matching a caption with a negative video.

Thus, the model trainer 104 may use noise robust multimodal representation learning for self-supervised learning on the unannotated multimodal data 102 to generate a multimodal learning model 106. In various examples, the multimodal learning model 106 may then be used to perform one or more downstream tasks. In some examples, the downstream tasks may include visual question answer and text-to-video retrieval tasks. For example, a visual question answer task may include receiving a question regarding information in the visual modality and automatically generating an answer using the trained multimodal learning model 106. As another example, a text-to-video retrieval task may include receiving a text including a description of a video to be retrieved and automatically retrieving the video using the trained multimodal learning model.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional data, model trainers, or additional multimodal learning models, etc.). For example, although described with respect to two modalities, any number of additional modalities may be included in the unannotated multimodal data.

FIG. 2 is an example multimodal data visualization with concepts clustered in monomodal spaces. The example multimodal data visualization 200 of FIG. 2 includes a visual modality 202 and an auditory modality 204. The visual modality 202 includes clusters of video frames, including a cluster of video frames 206A, 206B, 206C, 206D depicting video frames that include knives, a cluster of frames 206E, 206F, 206G, 206H depicting video frames that include ovens, and a cluster of frames 206I, 206J, and 206K depicting video frames including tires. The auditory modality 204 includes a cluster of texts 208A, 208B, 208C including the concept "knife," a cluster of texts 208D, 208E, 208F, 208G including the concepts "check" and "tire", and a cluster of texts 208H, 208I, 208J, and 208K including the concept "oven." The visual modality 202 includes correctly associated pairs of concepts 210A, 210B, 210C, 210D, 210E, 210F, 210G, 210E, 210F indicated using solid lines, incorrectly associated pairs of concepts 210G and 210H indicated using dashed lines, and correctly associated pairs of concepts 210I, 210J, 210K similarly indicated using solid lines.

Figure 3:
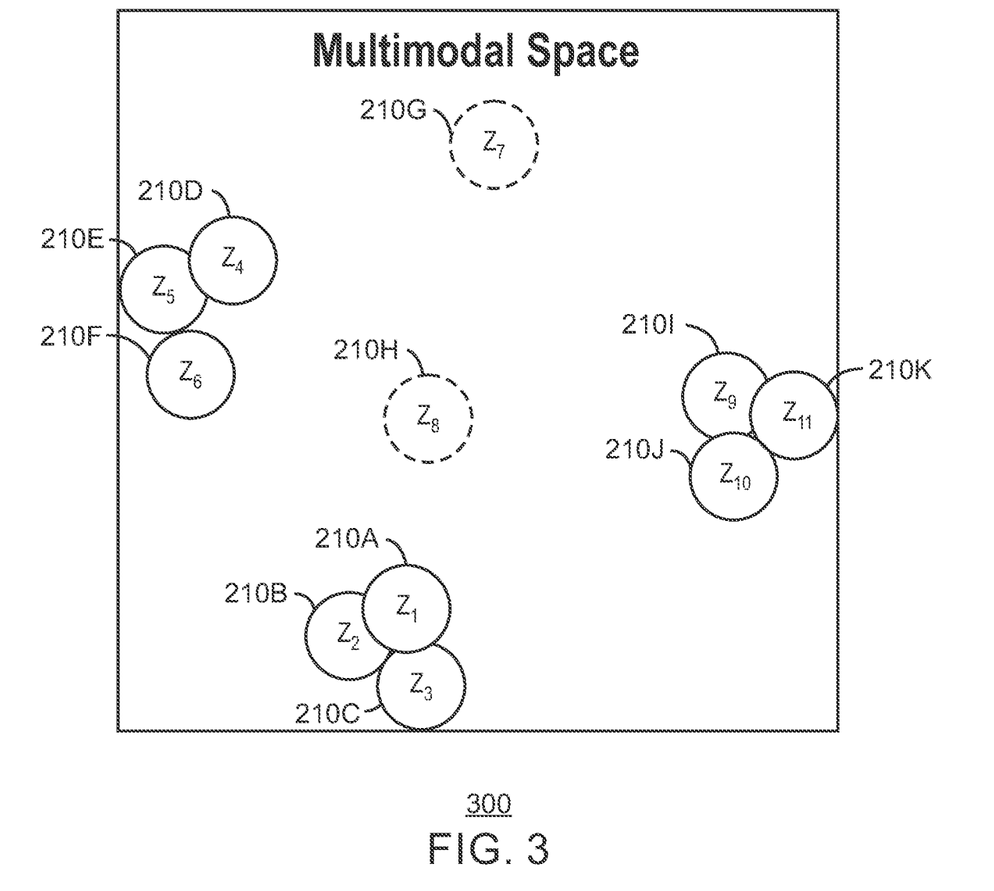
FIG. 3 is an example multimodal space with clustered pairs of concepts.

In various examples, each of the initial monomodal embedding spaces of the unannotated multimodal data 202 and 204 may contain somewhat dense clusters of concepts. For example, a concept may be "cutting", "knife", "check", "tire", "oven", as shown in FIG. 2. In various examples, the concepts may be analyzed using feature vectors generated using any suitable form of feature extraction. For example, concepts in the visual modality 202 may be represented using extracted feature vectors representing visual features such as edges, corners, internet points, blobs, ridges, etc. Concepts in the auditory modality 204 may be represented using feature vectors representing features such as features used by automatic speech recognition systems. Using any suitable distance function, the feature vectors corresponding to video frames 206A, 206B, 206C, 206D, 206E, 206F, 206G, 206H and texts 208A, 208B, 208C, 208D, 208E, 208F, 208G, 208H, 208I, 208J, and 208K can be clustered based on similarity. For example, the distance function used may be the Euclidean distance function. In various examples, correctly associated pairs 210A-210F and 210I-210K may be more likely to form dense clusters in both modalities that contain pairs that are also associated with each other and of the same concept. By contrast, wrongly associated pairs 210G and 210H still belong to dense clusters in both modalities, but these clusters do not contain pairs that are generally associated with each other. For example pair 210G includes a video frame 206E of an oven matched with the phrase "it's time to check" 208E that belongs to a group of phrases generally associated with checking tires. Pair 210 H includes a video frame 206D depicting a knife associated with the phrase 208J "after one hour in the oven" that belongs to a cluster associated with the concept of an oven rather than the concept of a knife. Therefore, in order to detect such noise, a multimodal space may be constructed as shown in FIG. 3, such that points representing pairs of associated concepts belonging to clusters that are generally associated are clustered together. Points representing pairs of associated concepts that are not clustered together may thus represent noise.

FIG. 3 is an example multimodal space with clustered pairs of concepts. The multimodal space 300 includes pairs 210A-210K of FIG. 2 represented as points in FIG. 3.

In various examples, the distance between points in a multimodal space 300 as visualized in FIG. 3 may be computed using Eq. 1. In particular, given the assumption that concepts in multiple modalities of the multimodal space of FIG. 3 are expressed as a mixture model, correctly associated pairs are correlated with high density. Incorrectly associated pairs are similarly correlated with low density.

FIG. 4 is a process flow diagram of an example method that can train a multimodal machine learning model to execute downstream tasks using multimodal representation learning of unannotated multimodal data. The method 400 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8.

At block 402, unannotated multimodal data is received. In some examples, the unannotated multimodal data visual modality and an auditory modality. For example, the unannotated multimodal data may include video clips with associated audio represented as captions. In various examples, the unannotated multimodal data may include any other two modalities, such as any combination of a visual modality, an auditory modality, a At block 404, a probability of an associated pairs of different modalities in the unannotated multimodal data to be correctly associated is estimated using a multimodal similarity function and a local density estimation. For example, a minimum of normalized similarity values for each modality of the associated pair of different modalities in comparison with other values of corresponding modalities in the unannotated multimodal data may be calculated. Thus, a similarity of the pair may be lower if the similarity values in either of the modalities is low, and higher if the similarity values in both modalities are high. In various examples, if the pair belongs to dense clusters in monomodal spaces of the different modalities that are associated with each other, then the probability of the associated pairs of different modalities in the unannotated multimodal data to be correctly associated may be higher. By contrast, if either of the pair belongs to clusters that are not dense, or if the pair belong to dense clusters in the different modalities that are not associated with each other, then the probability may be lower. In various examples, using a multimodal space, such as the example multimodal space of FIG. 3, the probability that the associated pair of different modalities are correctly associated may be higher between points that are more densely clustered. In some examples, a processor may detect that the associated pair of different modalities are correctly associated in response to detecting that the associated pair belongs to a cluster in a multimodal space with a density above a threshold value. Thus, the probability of correctness of association of the pairs is correlated to the clustering of similar points in the multimodal space. A density estimation may therefore be used to estimate noise in the samples. In various examples, a k-nearest neighbor density estimation may be performed in a multimodal space. For example, the k-nearest neighbor density estimation may be performed using Eqns. 3 and 4.

At block 406, a multimodal representation learning model is trained on the unannotated multimodal data using the estimated probability to be correctly associated as a weight for each of the sample pairs in a loss function. For example, multimodal representation learning model can be trained using the soft max margin loss function of Eqn. 5. In various examples, the weights can be integrated into any number of other suitable additive loss functions in a similar manner.

At block 408, downstream tasks are executed using the trained multimodal representation learning model. In some examples, the downstream tasks may include a visual question answer task. For example, a visual question answer task may include receiving a question regarding information in a visual modality and automatically generating an answer using the trained multimodal learning model. In various examples, a text-to-video retrieval task may be executed. For example, the text-to-video retrieval task may include receiving a text including a description of a video to be retrieved and automatically retrieving the video using the trained multimodal learning model. In various examples, any other downstream tasks that include language and vision may be executed using the trained multimodal representation learning model.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

In some scenarios, the techniques described herein may be implemented in a cloud computing environment. As discussed in more detail below in reference to at least FIGS. 5-8, a computing device configured to train a multimodal machine learning model may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
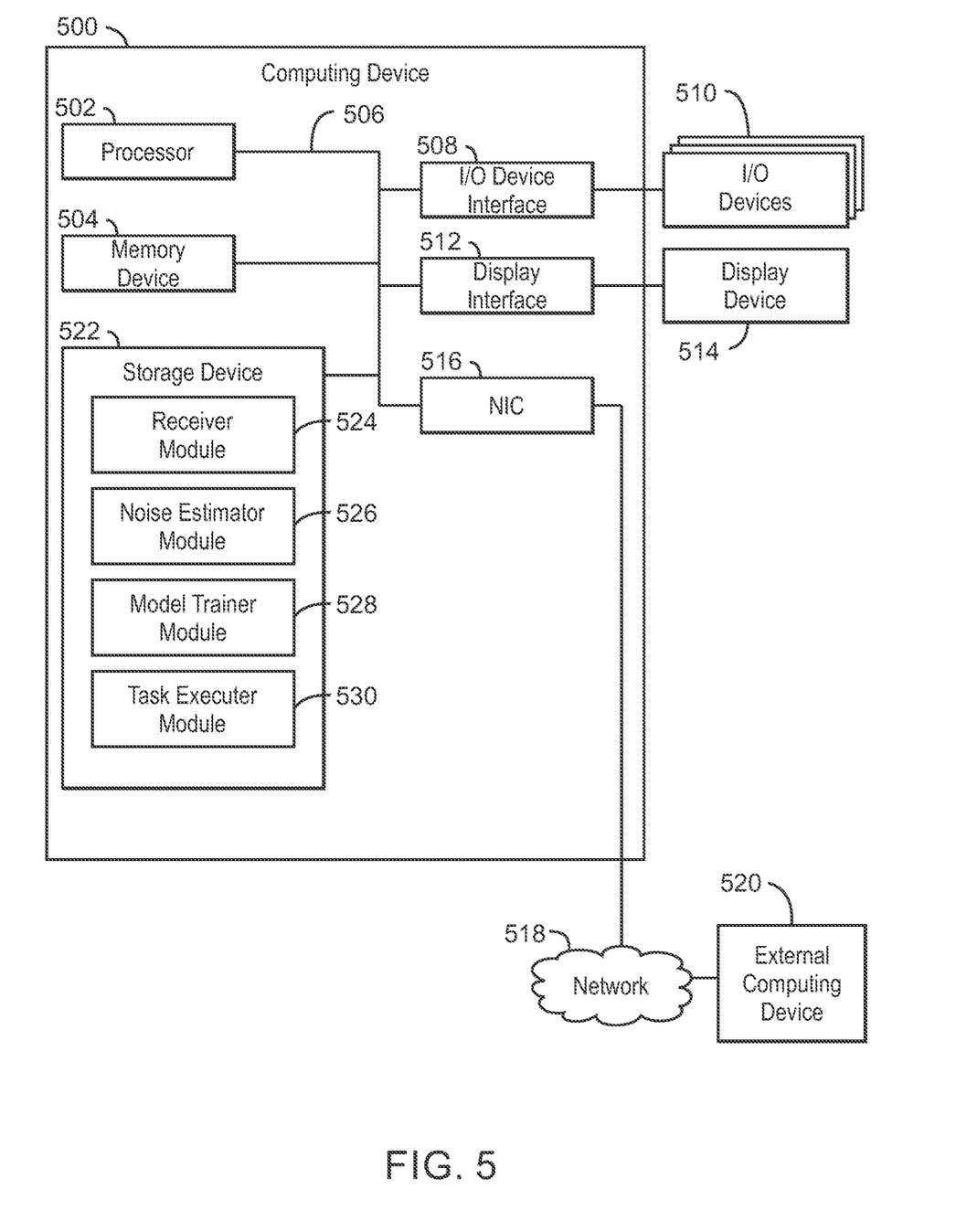
FIG. 5 is a block diagram of an example computing device that can train a network to execute downstream tasks using multimodal representation machine learning of unannotated multimodal data.

FIG. 5 is block diagram of an example computing device that can train a network to execute downstream tasks using multimodal representation machine learning of unannotated multimodal data. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, a noise estimator module 526, a model trainer module 528, and a task executer module 530. The receiver module 524 can receive unannotated multimodal data. For example, the unannotated multimodal data may include a visual modality and an auditory modality. In some examples, the unannotated multimodal data may include video clips with associated captions corresponding to speech in the video clips. The noise estimator module 526 can estimate a probability an associated pair of different modalities in the unannotated multimodal data to be correctly associated using a multimodal similarity function and a local density estimation. For example, the multimodal similarity function may include a minimum of normalized similarity values for each modality of each sample pair. In various examples, the local density estimation may be a k-nearest neighbor density estimation. Thus, a correlation between the different modalities may be used to estimate noise in the unannotated multimodal data. The model trainer module 528 can train a multimodal representation learning model on the unannotated multimodal data using the estimated probability to be correctly associated as a weight for the associated pair in a loss function. For example, the loss function may be a soft max margin ranking loss function. The task executer module 530 can execute a downstream task using the trained multimodal representation learning model. In some examples, the downstream task may include a visual question answer task. For example, a visual question answer task may include receiving a question regarding information in a visual modality and automatically generating an answer using the trained multimodal learning model. In various examples, a text-to-video retrieval task may be executed. For example, the text-to-video retrieval task may include receiving a text including a description of a video to be retrieved and automatically retrieving the video using the trained multimodal learning model It is to be understood that the block diagram of FIG. 5 is not intended to indicate that the computing device 500 is to include all of the components shown in FIG. 3. Rather, the computing device 500 can include fewer or additional components not illustrated in FIG. 5 (e.g., additional memory components, embedded controllers, modules, additional network interfaces, etc.). Furthermore, any of the functionalities of the receiver module 524, the noise estimator module 526, the model trainer module 528, or the task executer module 530, may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, noise estimator module 526, and model trainer module 528, and the task executer module 530, can be implemented with logic, wherein the logic, as referred to herein, can include any suitable hardware (e.g., a processor, among others), software (e.g., an application, among others), firmware, or any suitable combination of hardware, software, and firmware.

Figure 6:
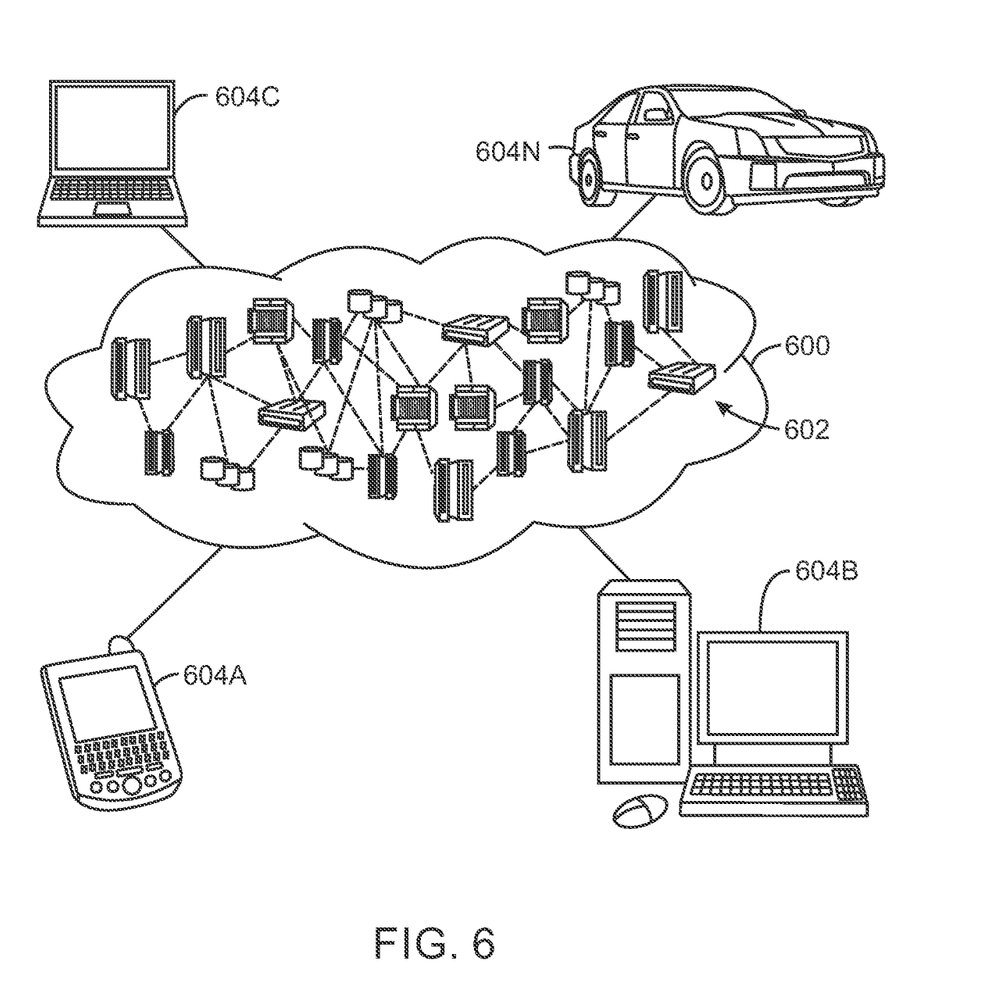
FIG. 6 is a diagram of an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
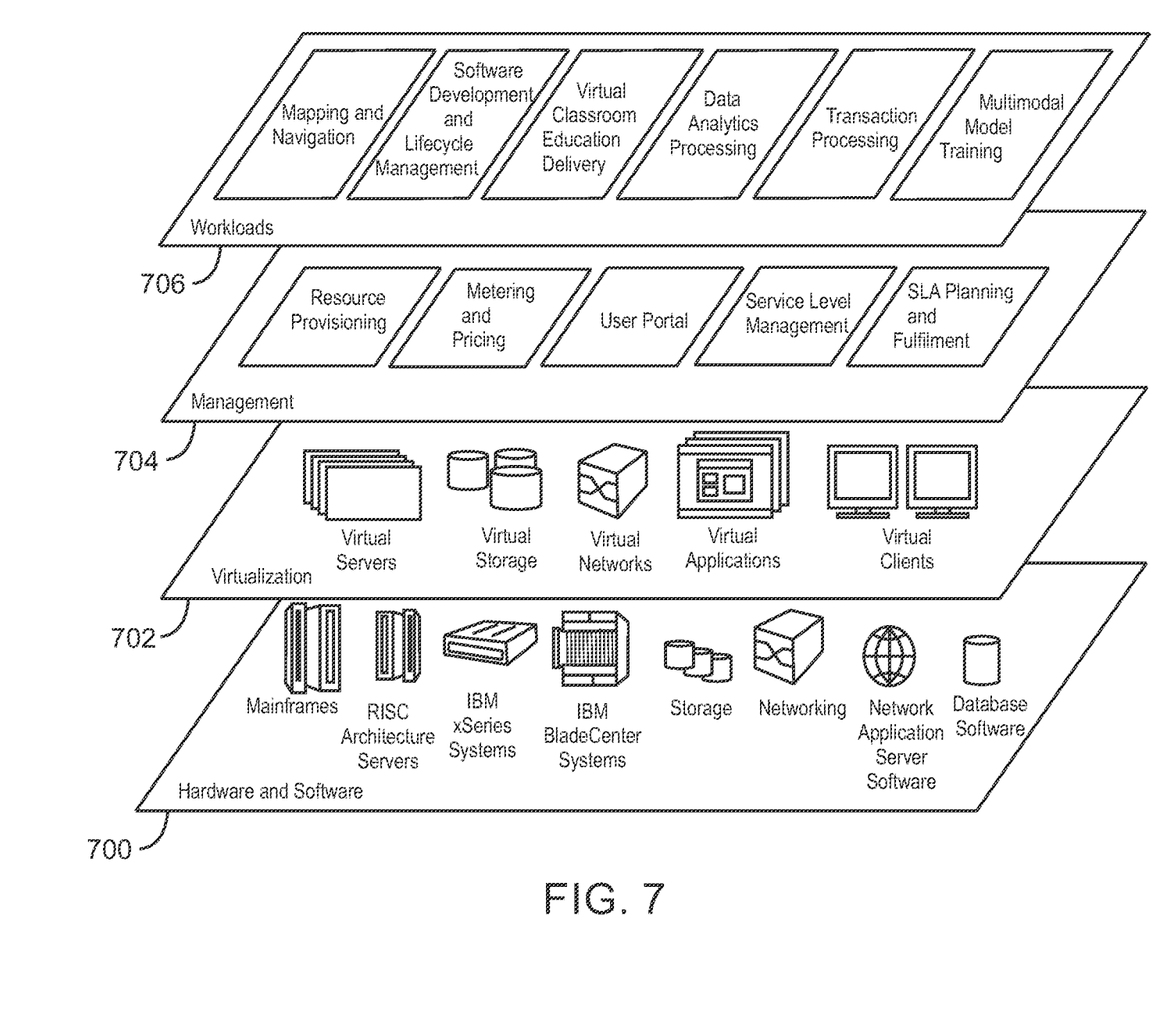
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and multimodal model training.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
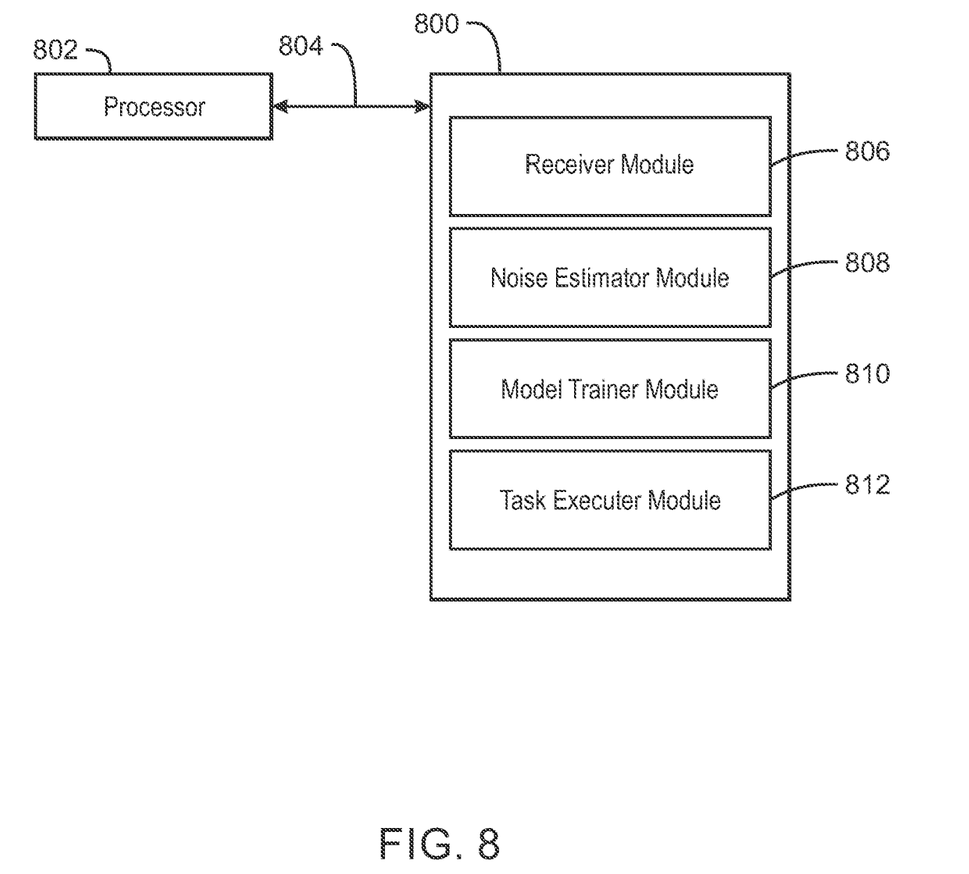
FIG. 8 is an example tangible, non-transitory computer-readable medium that can train a model to execute downstream tasks using multimodal representation machine learning of unannotated multimodal data.

Referring now to FIG. 8, a block diagram is depicted of an example tangible, non-transitory computer-readable medium 800 that can train a model to execute downstream tasks using multimodal representation machine learning of unannotated multimodal data. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the method 400 of FIG. 4.

The various software components discussed herein may be stored on the tangible, non-transitory, computer-readable medium 800, as indicated in FIG. 8. For example, a receiver module 806 includes code to receive unannotated multimodal data. For example, the unannotated multimodal data may include a visual modality and an auditory modality. In some examples, the unannotated multimodal data may include video clips with associated captions corresponding to speech in the video clips. A noise estimator module 808 includes code to estimate a probability an associated pair of different modalities in the unannotated multimodal data to be correctly associated using a multimodal similarity function and a local density estimation. For example, the multimodal similarity function may include a minimum of normalized similarity values for each modality of each sample pair. In various examples, the local density estimation may be a k-nearest neighbor density estimation. A model trainer module 810 includes code to train a multimodal representation learning model on the unannotated multimodal data using the estimated probability to be correctly associated as a weight for the associated pair in a loss function. A task executer module 812 includes code to execute a downstream task using the trained multimodal representation learning model. In some examples, the downstream tasks may include a visual question answer task. For example, a visual question answer task may include receiving a question regarding information in a visual modality and automatically generating an answer using the trained multimodal learning model. In various examples, a text-to-video retrieval task may be executed. For example, the text-to-video retrieval task may include receiving a text including a description of a video to be retrieved and automatically retrieving the video using the trained multimodal learning model. It is to be understood that any number of additional software components not shown in FIG. 8 may be included within the tangible, non-transitory, computer-readable medium 800, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a processor;
a memory; and
program instructions stored on the memory for execution by the processor to:
receive unannotated multimodal data comprising two or more of visual modalities, auditory modalities, and language modalities, wherein the unannotated multimodal data comprises a plurality of pairs of concepts from different modalities;
estimate a respective probability that a respective pair of concepts, of the plurality of pairs of concepts, from the different modalities are of a same concept using a multimodal similarity function and a local density estimation;
detect, based on the estimation of the respective probability, noise in the unannotated multimodal data, wherein
the noise is detected based on at least one wrongly associated pair of concepts, of the plurality of pairs of concepts, that include different concepts;
integrate the detected noise into a loss function based on integration of a respective weight for the respective pair of concepts into the loss function, wherein
the respective weight corresponds to the estimated respective probability;
train, based on the integration of the detected noise into the loss function, a multimodal representation learning model on the unannotated multimodal data, wherein
the multimodal representation learning model is trained based on the respective weight for the detected noise from the at least one wrongly associated pair of concepts; and
execute, by the trained multimodal representation learning model, one or more downstream machine learning tasks involving multimodal data.

2. The system of claim 1, wherein the local density estimation comprises a k-nearest neighbor density estimation.

3. The system of claim 1, wherein the multimodal similarity function comprises a minimum of normalized similarity values for each modality of each sample pair of concepts of the plurality of pairs of concepts.

4. The system of claim 1, wherein the loss function comprises a soft max margin ranking loss function.

5. A computer-implemented method, comprising:
receiving, via a processor, unannotated multimodal data comprising two or more of visual modalities, auditory modalities, and language modalities, wherein the unannotated multimodal data comprises a plurality of pairs of concepts from different modalities;
estimating, via the processor, that a respective probability of a respective pair of concepts, of the plurality of pairs of concepts, from the different modalities are of a same concept using a multimodal similarity function and a local density estimation;
detecting, based on the estimation of the respective probability, noise in the unannotated multimodal data, wherein
the noise is detected based on at least one wrongly associated pair of concepts, of the plurality of pairs of concepts, that include different concepts;
integrating the detected noise into a loss function based on integration of a respective weight for the respective pair of concepts into the loss function, wherein
the respective weight corresponds to the estimated respective probability;
training, via the processor, based on the integration of the detected noise into the loss function, a multimodal representation learning model on the unannotated multimodal data, wherein
the multimodal representation learning model is trained based on the respective weight for the detected noise from the at least one wrongly associated pair of concepts; and
executing, by the trained multimodal representation learning model, one or more downstream machine learning tasks involving multimodal data.

6. The computer-implemented method of claim 5, wherein the multimodal similarity function comprises calculating a minimum of normalized similarity values for each modality of each respective pair of concepts of the plurality of pairs of concepts from the different modalities in comparison with other values of corresponding modalities in the unannotated multimodal data.

7. The computer-implemented method of claim 5, wherein the local density estimation comprises performing a k-nearest neighbor density estimation in a multimodal space.

8. The computer-implemented method of claim 5, further comprising detecting, via the processor, that the respective pair of concepts from the different modalities is of the same concept based on detecting that the respective pair of concepts belongs to a cluster in a multimodal space with a density above a threshold value.

9. The computer-implemented method of claim 5, wherein the one or more downstream machine learning tasks further comprise: receiving a question regarding information in one or more of the visual modalities, and automatically generating an answer using the trained multimodal representation learning model.

10. The computer-implemented method of claim 5, wherein the one or more downstream machine learning tasks further comprise receiving a text including a description of a video to be retrieved, and automatically retrieving the video using the trained multimodal representation learning model.

11. The computer-implemented method of claim 5, wherein the visual modalities include extracted feature vectors representing visual features that are selected from a group consisting of edges, corners, internet points, blobs, and ridges.

12. The computer-implemented method of claim 5, wherein the auditory modalities include extracted feature vectors related to automatic speech recognition systems.

13. A computer program product for training multimodal representation learning models, the computer program product comprising a computer-readable storage medium having program code embodied therewith, the program code executable by a processor to cause the processor to:
- receive unannotated multimodal data comprising two or more of visual modalities, auditory modalities, and language modalities, wherein the unannotated multimodal data comprises a plurality of pairs of concepts from different modalities;
- estimate a respective probability that a respective pair of concepts, of the plurality of pairs of concepts, from the different modalities are of a same concept using a multimodal similarity function and a local density estimation;
- detect, based on the estimation of the respective probability, noise in the unannotated multimodal data, wherein
  - the noise is detected based on at least one wrongly associated pair of concepts, of the plurality of pairs of concepts, that include different concepts;
- integrate the detected noise into a loss function based on integration of a respective weight for the respective pair of concepts into the loss function, wherein
  - the respective weight corresponds to the estimated respective probability;
- train, based on the integration of the detected noise into the loss function, a multimodal representation learning model of the multimodal representation learning models on the unannotated multimodal data, wherein
  - the multimodal representation learning model is trained based on the respective weight for the detected noise from the at least one wrongly associated pair of concepts; and
- execute, by the trained multimodal representation learning model, one or more downstream machine learning tasks involving multimodal data.

14. The computer program product of claim 13, wherein the program code executable by the processor further causes the processor to calculate a minimum of normalized similarity values for each modality of each respective pair of concepts of the plurality of pairs of concepts from the different modalities in comparison with other values of corresponding modalities in the unannotated multimodal data.

15. The computer program product of claim 13, wherein the program code executable by the processor further causes the processor to perform a k-nearest neighbor density estimation in a multimodal space.

16. The computer program product of claim 13, wherein the program code executable by the processor further causes the processor to detect that the respective pair of concepts from the different modalities is of the same concept based on a detection that the respective pair of concepts belongs to a cluster in a multimodal space with a density above a threshold value.

17. The computer program product of claim 13, wherein the one or more downstream machine learning tasks comprise reception of a question regarding information in one or more of the visual modalities of the unannotated multimodal data, and automatic generation of an answer using the trained multimodal representation learning model.

18. The computer program product of claim 13, wherein the one or more downstream machine learning tasks comprise reception of a text including a description of a video to be retrieved from the unannotated multimodal data, and automatic retrieval of the video using the trained multimodal representation learning model.

19. The computer program product of claim 13, wherein the visual modalities include extracted feature vectors representing visual features that are selected from a group consisting of edges, corners, internet points, blobs, and ridges.

20. The computer program product of claim 13, wherein the auditory modalities include extracted feature vectors related to automatic speech recognition systems.

\* \* \* \* \*